G. F. ECKART.
WORM GEAR DRIVE.
APPLICATION FILED FEB. 7, 1921.
1,397,317.
Patented Nov. 15, 1921.
2 SHEETS—SHEET 1.
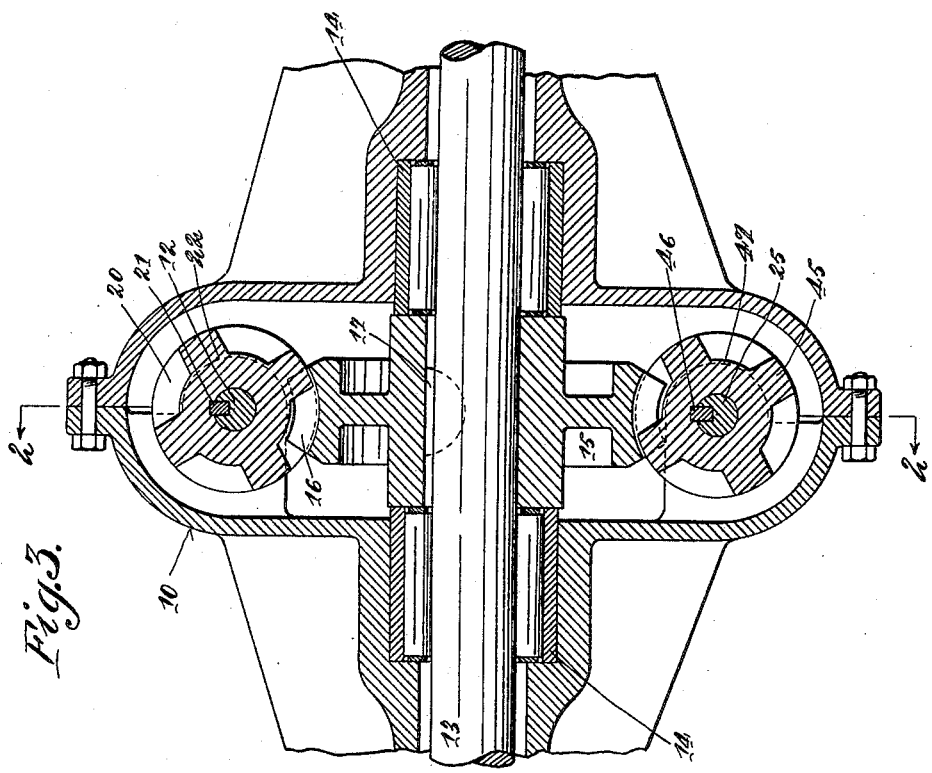
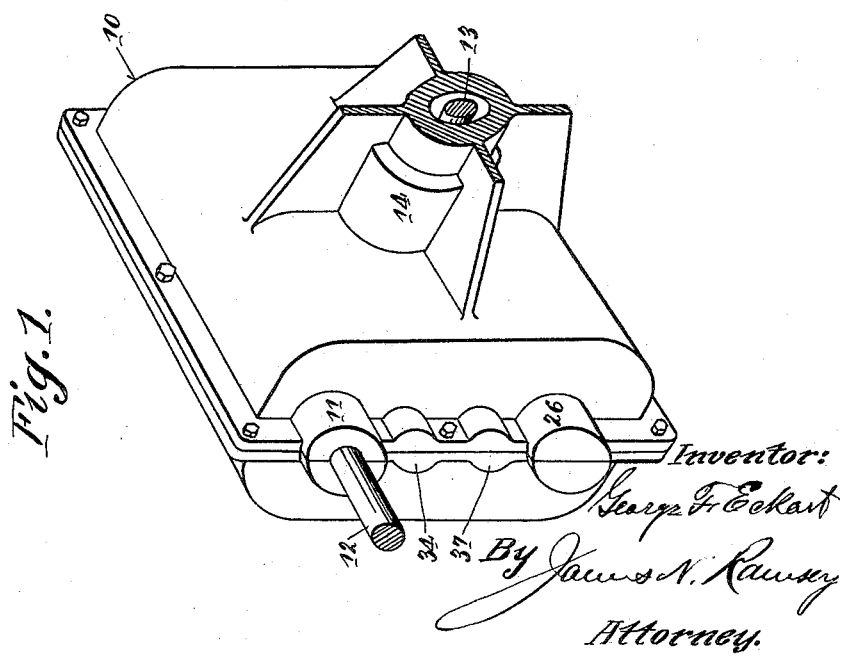
Inventor:
George F. Eckart
By James N. Ramsey
Attorney.

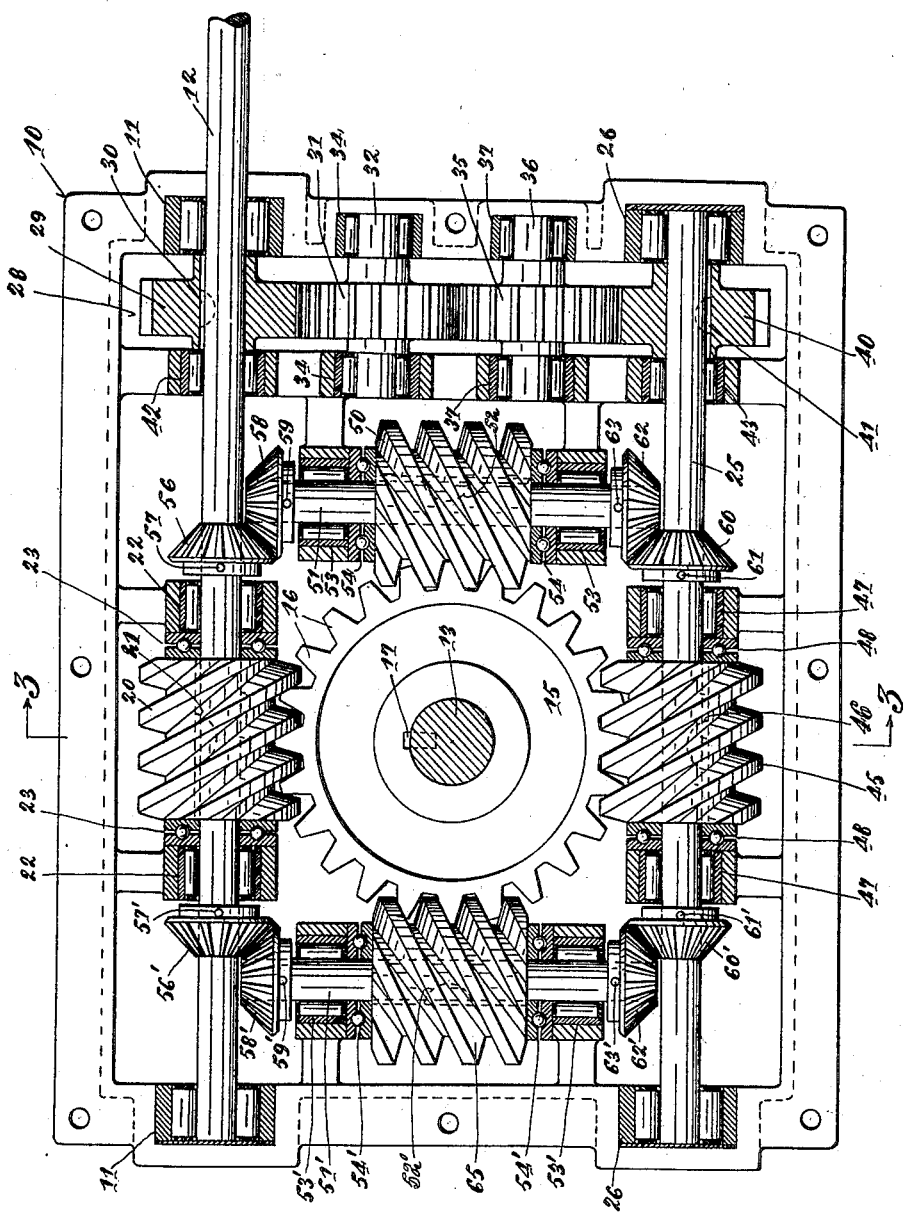

UNITED STATES PATENT OFFICE.

GEORGE F. ECKART, OF CINCINNATI, OHIO.

WORM-GEAR DRIVE.

1,397,317.  Specification of Letters Patent.  Patented Nov. 15, 1921.

Application filed February 7, 1921. Serial No. 443,169.

*To all whom it may concern:*

Be it known that I, GEORGE F. ECKART, a citizen of the United States, residing at Cincinnati, in the county of Hamilton and State of Ohio, have invented certain new and useful Improvements in Worm-Gear Drives, of which the following is a specification.

It has heretofore been the practice in worm gear drives for automobile trucks, elevators and other constructions where a drive of this character is required for unusually heavy duty, to employ a worm wheel meshing with but a single worm. This method results in an unusually heavy pressure on both the teeth in the worm and wheel, and also results in exceedingly heavy end thrust on the worm shaft in a longitudinal direction and also an exceedingly heavy thrust of the worm wheel away from the worm. The exceedingly heavy service required of this type transmission, results in very short life to both the worm and the wheel by the rapid wearing of the teeth.

It is the object of my invention to provide a worm gear drive wherein the exceedingly heavy end thrust on the worm shaft is divided and distributed over a plurality of worms and shafts, and further to locate these worms in such a manner as to balance the side thrust of the wheel.

My invention consists in providing a plurality of worms in mesh with and actuating a single worm wheel and driving connections between them, whereby end thrust and friction is greatly reduced and wear on the parts practically eliminated. My invention further consists in the combination and arrangement of parts as herein described and claimed.

In the drawings:

Figure 1 is a perspective view of the casing having my improved construction inclosed therein.

Fig. 2 is a central vertical section of my invention taken in a plane corresponding to the line 2—2 of Fig. 3.

Fig. 3 is a vertical cross section, taken in a plane corresponding to the line 3—3 of Fig. 2.

A casing 10 has journaled therein on antifriction bearings 11, a drive shaft 12. A driven shaft 13 is journaled on antifriction bearings 14 in the casing, and at right angles to the drive shaft 12. A worm wheel 15 having teeth 16 is secured to the driven shaft as by a key 17. A worm 20 is secured to the drive shaft as by a key 21 and meshes with the worm wheel. The portions of the drive shaft adjacent the worm are journaled in antifriction bearings 22. Such slight end thrust as there may be is received by antifriction thrust bearings 23 placed between the worm 20 and the bearings 22.

The construction thus far described is of the usual form as applied to worm drives having all of the disadvantages common thereto. To avoid excessive wear and end thrusts, I provide a series of opposed driving worms, having driving connection with one another and with the drive shaft.

Thus, the ends of a secondary shaft 25 are journaled in antifriction bearings 26. Driving connection is had between the secondary shaft and the drive shaft through a gear train 28, comprising a spur gear 29 secured to the drive shaft by a key 30, meshing with an idler gear 31 integrally formed with a short shaft 32 and journaled in antifriction bearings 34. The idler gear 31 meshes with a second idler gear 35 integrally formed with a short shaft 36 and journaled in antifriction bearings 37. The second idler 35 in turn meshes with a gear 40 secured to the secondary shaft as by a key 41. An additional antifriction bearing 42 for the drive shaft is located adjacent the gear 29 thereon, and on the opposite side to one of the bearings 11. An additional antifriction bearing 43 for the secondary shaft is located adjacent the gear 40 thereon and on the opposite side to one of the bearings 26.

A second worm 45 is secured to the secondary shaft as by a key 46 meshing with and actuating the worm wheel. The portions of the secondary shaft adjacent the worm 45 are journaled in antifriction bearings 47. For receiving such end thrust as there may be, thrust bearings 48 are located between the worm 45 and the bearings 47. The worm is preferably located on the secondary shaft in a position directly opposite to the worm 20 on the drive shaft.

A third worm 50 is located at right angles to and has driving connection with the drive shaft and the secondary shaft. Thus, the worm 50 is secured to an intermediate shaft 51 as by a key 52. The intermediate shaft is journaled in antifriction bearings 53 located to either side of the worm. Antifriction thrust bearings 54 are interposed between the worm and bearings 53. To drive the worm 50, a bevel gear 56 secured to the drive shaft by a pin 57 meshes with a bevel gear 58 secured to one end of the intermediate shaft by a pin 59. A second driving connection for the worm 50 is had, as by a bevel gear 60 secured to the secondary shaft by a pin 61, meshing with a bevel gear 62 secured to the other end of the intermediate shaft by a pin 63. A fourth worm 65 similar to the worm 50 meshes with and actuates the worm wheel and is located directly opposite to the worm 50. Driving connections are had with both the drive and secondary shafts by bevel gears similar to those for the worm 50. The parts are therefore referred to by similar but primed reference numerals.

I have illustrated my invention with four driving worms. It is obvious, however, that in constructions where the size of the worm wheel permits, it will be possible to dispose a greater number of worms about the circumference of the worm wheel and in mesh therewith and have driving connections between them without departing in any manner from the spirit of my invention.

In operation, as herein illustrated, with four worms, the worm 20 on the drive shaft transmits one-fourth of the power to the worm wheel, similarly, the worm 45 on the secondary shaft opposite to the worm 20 transmits one-fourth of the power, driving connection being had by means of gear train 28. Also the worms 50 and 65 at right angles to the worms on the drive and secondary shafts and opposite to one another transmit one-fourth of the power each to the worm wheel.

It will be observed that at no time are any of the gears subjected to the entire strain of the power transmitted through my improved device, thus making it possible for a given size of worm wheel to transmit four times the amount of power than was heretofore possible with a single worm and wheel. However, if the device is so designed as to be capable of transmitting a given power through a single worm and wheel, the addition of the other worms and the driving connections therefor, will considerably lengthen the life of the entire mechanism by greatly reducing the friction of the moving parts. Further the device is capable of sustaining loads without breakage, far in excess of that now possible. Also the thrust and driving force is distributed over four worms and four distinct and separate parts of the circumference of the worm wheel. The pressure on the threads of the worm and the teeth of the worm wheel being thus greatly reduced avoids the breaking down of the lubricant film thereon and avoiding wear therein. The outward thrust tending to force the worm wheel away from the worm is counterbalanced by the worms on opposite sides. By thus keeping the teeth on the worm wheel and the threads on the worm in their proper relation, wear is avoided as is occasioned when their proper relation to one another is not held.

My construction is capable of some modification without departing in any manner from the spirit of my invention.

What I claim as new and useful and desire to secure by Letters Patent is:

1. A worm gear drive comprising a drive shaft, a secondary shaft, driving connections between said drive shaft and said secondary shaft, a plurality of intermediate shafts between said drive shaft and said secondary shaft, driving connections between said intermediate shafts and said drive shaft and said secondary shaft, a driven shaft, a worm wheel on said driven shaft, and worms on said drive shaft and secondary shaft and intermediate shafts meshing with and actuating said worm wheel on said driven shaft.

2. A worm gear drive comprising a drive shaft, a secondary shaft, driving connections between said drive shaft and said secondary shaft, parallel intermediate shafts extending at right angles to said drive shaft and said secondary shaft, driving connections between said intermediate shafts and said secondary shaft and drive shaft, a driven shaft, a worm wheel on said driven shaft, and worms on said drive shaft and secondary shaft and intermediate shaft meshing with and collectively actuating said worm wheel.

3. A worm gear drive comprising in combination, a casing therefor, bearings in said casing, a driven shaft journaled in said bearings, a drive shaft, bearings in said casing for said drive shaft, a worm wheel on said driven shaft, a secondary shaft, bearings in said casing for said secondary shaft, gearing between said drive shaft and said secondary shaft adapted to rotate said drive shaft and said secondary shaft in opposite directions, a plurality of intermediate shafts, bearings in said casing for said intermediate shafts, gearing between said intermediate shafts and said secondary shaft and said drive shaft adapted to rotate said intermediate shafts in opposite directions, and worms on said intermediate shafts and secondary shaft and said drive shaft meshing with and collectively actuating said worm wheel.

4. In a worm gear drive a driven shaft, a worm wheel on said driven shaft, a plurality of pairs of opposed shafts, gearing between said opposed shafts, and worms on said opposed shafts meshing with and collectively actuating said worm wheel on said driven shaft.

GEORGE F. ECKART.